United States Patent
Reiner et al.

(10) Patent No.: US 8,247,061 B2
(45) Date of Patent: Aug. 21, 2012

(54) METHOD FOR CALIBRATING THE MEASUREMENTS OF AN ANNULAR BODY

(75) Inventors: Juergen Reiner, Gestratz (DE); Bernd Lutz, Kempten (DE)

(73) Assignee: Robert Bosch GmbH, Stuttgart (DE)

( * ) Notice: Subject to any disclaimer, the term of this patent is extended or adjusted under 35 U.S.C. 154(b) by 992 days.

(21) Appl. No.: 11/994,233

(22) PCT Filed: May 22, 2006

(86) PCT No.: PCT/EP2006/062477
§ 371 (c)(1),
(2), (4) Date: Jun. 27, 2008

(87) PCT Pub. No.: WO2007/000380
PCT Pub. Date: Jan. 4, 2007

(65) Prior Publication Data
US 2008/0280091 A1    Nov. 13, 2008

(30) Foreign Application Priority Data
Jun. 29, 2005   (DE) .......................... 10 2005 030 209

(51) Int. Cl.
*B29C 35/02*   (2006.01)
*B29C 71/02*   (2006.01)
(52) U.S. Cl. ....................................... 428/80; 428/66.6
(58) Field of Classification Search ............... 428/80, 428/66.6
See application file for complete search history.

(56) References Cited

U.S. PATENT DOCUMENTS

| | | | |
|---|---|---|---|
| 4,297,306 A | | 10/1981 | Yoshino et al. |
| 4,957,669 A | * | 9/1990 | Primm .......................... 264/443 |
| 5,422,048 A | | 6/1995 | Kodama et al. |
| 2003/0227104 A1 | | 12/2003 | Majeski |
| 2004/0206443 A1 | * | 10/2004 | Monsheimer et al. ........ 156/73.1 |

FOREIGN PATENT DOCUMENTS

| | | |
|---|---|---|
| DE | 1 805 090 | 5/1970 |
| DE | 1 583 731 | 9/1970 |
| EP | 0 335 449 A1 | 10/1989 |
| EP | 0 391 586 A2 | 10/1990 |
| GB | 1 500 387 | 2/1978 |
| JP | 51144866 A | 12/1976 |
| JP | 6190630 A | 7/1994 |
| JP | 2001295098 A | 10/2001 |
| JP | 2003068355 A | 3/2003 |
| JP | 2006190913 A | 7/2006 |
| SU | 1291286 A1 | 2/1987 |
| WO | WO2004/110649 A1 * | 12/2004 |

\* cited by examiner

*Primary Examiner* — Brent Ohern

(57) ABSTRACT

Disclosed is a method for calibrating an annular-shaped body which is made of thermoplastic or at least partially crystalline plastic material, to an annular-shaped body which is produced according to the method, and to an oscillating object which is used in the method. Also disclosed is an oscillating object which is used to stimulate oscillations and which is introduced into an annular-shaped body by means of axial forward motion. Localized warming of the annular-shaped body is performed until the glass transition temperature of the material thereof is exceeded by localized contact of the oscillating object with the annular-shaped body. A desired, economical internal measurement having high precision is produced when the calibration section of the oscillating body is immersed into the annular-shaped body.

16 Claims, 1 Drawing Sheet

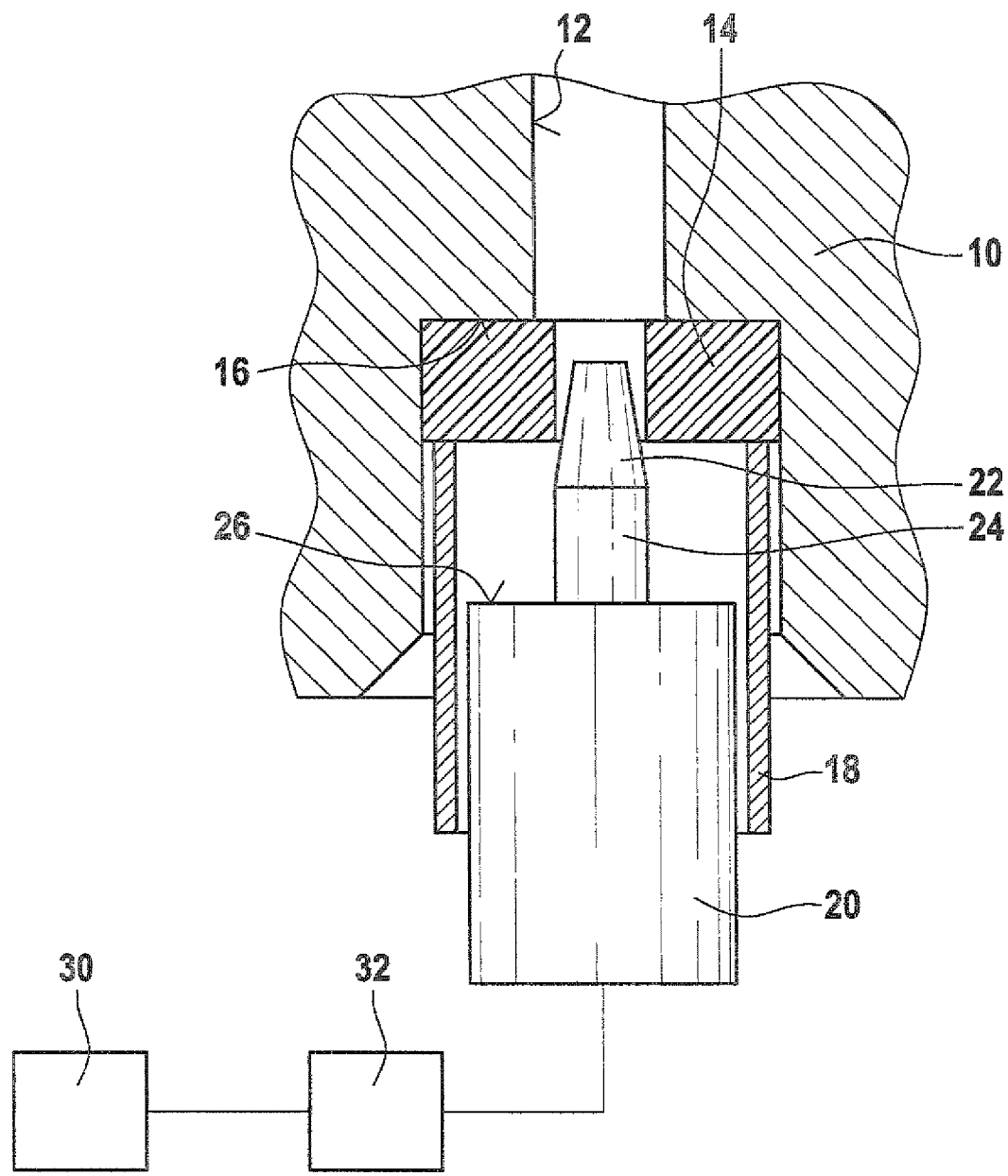

METHOD FOR CALIBRATING THE MEASUREMENTS OF AN ANNULAR BODY

CROSS-REFERENCE TO RELATED APPLICATION

This application is a 35 USC 371 application of PCT/EP 2006/062477 filed on May 22, 2006.

BACKGROUND OF THE INVENTION

1. Field of the Invention

The invention relates to a method for calibrating the internal measurements of an in particular annular body comprising at least partially crystalline or thermoplastic plastic, and/or to an annular body that is calibrated by the method, and/or to an oscillating body for use in the method.

2. Description of the Prior Art

Calibration methods are known that are performed purely mechanically, and in which the parts to be calibrated are typically not heated. For the calibration, a mandrel of defined external dimensions is pressed axially into the interior of an annular body, in order to adjust the internal measurements of this annular body to a desired set-point measurement by plastic deformation of material. The introduction of the mandrel causes local compression of material in the region of the inner surface of the annular body, and the extent of the compression of material is dependent on production tolerances of the annular body in the uncalibrated state. After the mandrel is removed, the material comprising the annular body rebounds, and this rebounding in turn depends on the extent of the prior compression of material. Consequently, the internal measurements of an annular body calibrated in this way still vary relatively greatly. In other words, the desired dimensional tolerances can be attained only somewhat precisely by such a known calibration method. Besides, annular bodies of partially crystalline or thermoplastic plastic are unsuitable for such calibration methods because their material tends to crack. The disadvantageous result is thus that parts are damaged at the outset, or in an extreme case even destroyed.

SUMMARY AND ADVANTAGES OF THE INVENTION

By comparison, a method according to the invention has the advantage that now even annular bodies of partially crystalline or thermoplastic plastic can be calibrated without causing cracks or damaging the parts at the outset. This is equally true for bodies of high-strength plastics, for instance glass-fiber-filled plastics. Since in the proposed method no elastic deformation of the material takes place, no rebounding of the material occurs, and thus the annular bodies can be produced with greater precision in their diameter and with closer tolerances than by the known methods. By the method of the invention, material heating to above its glass transition temperature takes place, and the material thus made to flow can be forced partly into existing adjacent irregularities and pores in the material. The overall effect is smoothing of the surface in the region of the internal measurements of the annular body, without leading to material compression and hence a lessening of the material elasticity. Simultaneously with the calibration, the material fibers can be oriented spatially to suit the later stress conditions, which again has a favorable effect on the stability of the thus-calibrated annular bodies.

An annular body that is produced by a method of the invention can be used as a slide bearing bush, for instance. As a result, the design of the bearing point can be clearly optimized with regard to the running-in performance, service life, and possible applications. Metal slide bearings or slide bearings of a metal and plastic composite material that are currently used can be replaced by more-economical plastic slide bearings, because of the greater precision attainable in slide bearing bushes of the invention. A plastic slide bearing bush is especially suitable for use as a guide bush for the piston of a piston pump in the hydraulic unit of an electrohydraulically regulatable vehicle brake system.

Oscillation bodies for use in the method of the invention advantageously have a sonotrode with a conically shaped introduction portion and a calibration portion axially adjoining this introduction portion. This shaping of the sonotrode on the one hand makes its economical production possible and on the other makes relatively simple method control possible, among other ways by regulating the axial advancement of the oscillating body.

BRIEF DESCRIPTION OF THE DRAWING

Further advantages or advantageous refinements of the invention will become apparent from the description contained herein below, with reference to the single drawing FIGURE which, in a sectional view, shows a detail of a calibration device with an annular body received in it, along with a sonotrode for calibrating the internal measurements of this annular body.

DESCRIPTION OF THE PREFERRED EMBODIMENT

In the drawing, a receiving device is identified by reference numeral 10. This receiving device has a receptacle 12, open toward the outside, for an annular body 14 that is to be calibrated, for example in terms of its inside diameter. This annular body 14 comprises a thermoplastic or an at least partially crystalline or thermoplastic plastic and has been produced beforehand in a conventional way, such as an injection molding process. The receptacle 12 is formed by a stepped bore that is reduced at least once in its diameter from the outside inward. This reduction in diameter creates a rectangularly embodied shoulder 16, on which the annular body 14 is braced axially. The smaller-diameter portion of the receptacle 12 has an inside diameter that is larger than the desired inside diameter of the annular body 14.

The portion of the receptacle 12 located toward the outside and having the larger inside diameter is adapted to the outside diameter of the annular body 14 in such a way that the latter is retained by radial pressure in the receptacle 12. By means of a holding-down device 18 that can be introduced from the outside into the receptacle 12, the annular body 14 can be additionally pressed axially against the shoulder 16 of the receptacle 12. This assures an especially reliable radial and axial fixation of the annular body 14 in the receptacle 12 during the ensuing calibration process.

In this calibration process, a sonotrode 20 is introduced from the outside into the interior of the annular body 14. For that purpose, the sonotrode 20 has a conically shaped introduction portion 22, which changes over, at an end remote from the annular body 14, into a cylindrical calibration portion 24. This calibration portion 24 is at least long enough axially that it can completely penetrate the annular body 14. On its end, the calibration portion 24 becomes a stop shoulder 26.

The sonotrode 20 is part of an oscillating body, known per se and not shown in detail, of the kind used for instance in ultrasonic welding systems. Such oscillating bodies include, besides the sonotrode 20, an electronically triggerable, preferably piezoelectronic sound transducer 30 and an amplitude transformation piece 32. By electronic triggering of the sound transducer 30, this element is excited to mechanical oscillations in the ultrasonic frequency range, which are transmitted via the amplitude transformation piece 32 to the actual calibration tool, that is, the sonotrode 20.

A sonotrode 20 oscillating in this way is introduced with axial advancement speed into the interior of the annular body 14 that is to be calibrated. In the event that the sonotrode 20 comes into contact with the inner wall of the annular body 14, the oscillations are transmitted mechanically. By molecular and boundary-face friction, heat is created, which causes the damping coefficient of the plastic material comprising the annular body 14 to increase. This causes a local rise in the temperature in the region of the inside diameter of the annular body 14 to beyond the glass transition temperature T(glas) of its material. Given the existing tolerances in terms of roundness and diameter, the annular body 14 therefore begins to soften locally. This reaction speeds up on its own, since because of the increase in the damping coefficient in the plastic material comprising the annular body 14, a greater proportion of the energy of oscillation is converted into heat. The softened and finally molten material comprising the annular body 14 can be positively displaced laterally into regions of possibly greater inside diameter, or otherwise axially outward out of the annular body 14, by the sonotrode 20 as it penetrates further.

With increasing entry of the sonotrode 20 into the annular body 14, a calibration portion 24 comes into engagement. Its diameter, together with the triggering parameters and the design of the oscillating body 30, 32, is adapted to the desired set-point diameter of the annular body 14. Once an axial terminal position of the sonotrode 20 is reached, in which the stop shoulder 26 rests on the face end, toward it, of the annular body 14, the annular body 14 is cooled down again to a temperature below the glass transition temperature T(glas) of its material, and the sonotrode 20 is retracted, counter to its introduction direction, from the annular body 14. Optionally, after that the body 14 can be removed, or automatically ejected, from the described receiving device 10.

In the manner described, slide bearing bushes or guide bushes in particular for piston pumps of electrohydraulically regulatable vehicle brake systems can be produced highly replicably and especially economically. They have a precision in terms of their roundness and their diameter tolerance that is high for plastic bushes and they can replace bushes of metal or metal and plastic composite materials that have been used until now and are expensive to produce because of the existing requirements for precision.

It is understood that changes or additions can be made compared to what has been described, without departing from the fundamental concept of the invention. In this regard, it should be noted that the term "annular body 14" used in the above description should not necessarily be interpreted as meaning circular-annular bodies, since bodies of oval or polygonal outer and/or inner contour can also be produced by the method described. Non-closed, open ring shapes can be produced as well. In addition, for performing the calibration process described, a separate receiving device 10 can be dispensed with, if the annular body 14 is disposed on it instead of in a corresponding receptacle 12 of some arbitrary product to be equipped with the annular body 14. This would have the advantage that as a result of the calibration, the tolerances of the receptacle 12 can simultaneously be eliminated, and that the calibration process could be integrated into an ongoing assembly process. The calibration method described can be performed in at least partly automated fashion.

The foregoing relates to a preferred exemplary embodiment of the invention, it being understood that other variants and embodiments thereof are possible within the spirit and scope of the invention, the latter being defined by the appended claims.

The invention claimed is:

1. An annular body, comprising a closed ring of partially crystalline or thermoplastic plastic material,
   wherein the closed ring constitutes one of a slide bearing bush of a slide bearing and a guide ring for a piston of a piston pump,
   wherein the annular body has a smooth inner surface, and
   wherein the inner surface is calibrated without plastic deformation of the plastic material by a process comprising the steps of:
      inserting the annular body into a receiving device;
      introducing of an oscillating body into an interior of the annular body with axial advancement with simultaneous excitation of the oscillating body to mechanical oscillations;
      locally heating the annular body to at least a glass transition temperature of its material by mechanical transmission of these oscillations to the annular body to effect a smoothing of the inner surface by forcing softened material partly into existing adjacent irregularities and pores in the material;
      continuing axial introduction of the oscillating body until a calibration portion of the oscillating body plunges into the annular body;
      cooling the annular body to a temperature below the glass transition temperature of its material; and
      optionally removing the annular body from the receiving device after a retraction of the oscillating body.

2. The annular body according to claim 1, wherein calibration of the inner surface further includes the step of radially fixing the annular body in the calibration portion during performance of the calibration.

3. The annular body according to claim 2, wherein calibration of the inner surface further includes the step of axially pressing the annular body against a shoulder of the receiving device by a holding-down device.

4. An oscillating body insertable into an interior of an annular body to be calibrated, the oscillating body comprising a sonotrode having a conical-shaped introduction portion and a cylindrical-shaped calibration portion adjoining the introduction portion at an end of the introduction portion remote from the annular body, wherein the introduction portion has a maximum diameter that is equivalent to the diameter of the calibration portion.

5. The oscillating body according to claim 4, wherein the calibration portion is at least long enough axially to completely penetrate the annular body.

6. The oscillating body according to claim 4, wherein the sonotrode includes an electronically triggerable sound transducer and an amplitude transformation piece.

7. The oscillating body according to claim 6, wherein the electronically triggerable sound transducer is a piezoelectric sound transducer.

8. The oscillating body according to claim 6, wherein the sound transducer is excited to mechanical oscillations in an ultrasonic frequency range by the electronic triggering of the sound transducer, which oscillations are transmitted via the amplitude transformation piece to the sonotrode.

9. The oscillating body according to claim 4, wherein the sonotrode is introduced into the interior of the annular body to be calibrated in an axial direction.

10. The oscillating body according to claim 4, wherein the sonotrode has a stop shoulder.

11. The oscillating body according to claim 10, wherein oscillations produced by the sonotrode, upon the sonotrode coming into contact with an inner wall of the annular body, are transmitted mechanically.

12. The oscillating body according to claim 9, wherein the calibration portion of the sonotrode comes into engagement with the annular body with increasing entry of the sonotrode into the interior of the annular body.

13. The oscillating body according to claim 4, wherein the calibration portion of the sonotrode is cylindrical and has a diameter adapted to a desired set-point diameter of the annular body.

14. The oscillating body according to claim 4, wherein heat is created by molecular and boundary-face friction between the sonotrode and the annular body, which causes a local rise in temperature in a region of an inside diameter of the annular body to at least the glass transition temperature of its material, thereby resulting in a local softening of the annular body.

15. The oscillating body according to claim 9, wherein the sonotrode is retracted from the interior of the annular body counter to the introduction direction once an axial terminal position is reach.

16. The oscillating body according to claim 9, wherein the sonotrode is simultaneously excited to mechanical oscillations as the sonotrode is introduced into the interior of the annular body to be calibrated.

* * * * *